United States Patent [19]
Ota et al.

[11] Patent Number: 5,849,183
[45] Date of Patent: Dec. 15, 1998

[54] FILTRATION APPARATUS

[75] Inventors: Seizo Ota; Tadao Uchiyama, both of Chiba-ken, Japan

[73] Assignee: Kabushiki Kaisha SYST, Chiba-ken, Japan

[21] Appl. No.: 790,197

[22] Filed: Jan. 30, 1997

Related U.S. Application Data

[63] Continuation-in-part of Ser. No. 705,750, Aug. 30, 1996, abandoned.

[51] Int. Cl.$^6$ ................................................. B01D 33/06
[52] U.S. Cl. ........................ 210/168; 210/171; 210/462; 210/407; 210/411; 198/716
[58] Field of Search ................................. 210/167, 168, 210/171, 402, 407, 409, 411, 403; 198/716

[56] References Cited

U.S. PATENT DOCUMENTS

| | | | |
|---|---|---|---|
| 1,627,550 | 5/1927 | Bachmann . | |
| 1,904,066 | 4/1933 | McArthur . | |
| 2,267,086 | 12/1941 | Donohue | 210/199 |
| 2,969,880 | 1/1961 | Lundholm et al. | 210/393 |
| 4,655,940 | 4/1987 | Harms | 210/805 |
| 4,724,077 | 2/1988 | Uchiyama | 210/394 |
| 4,895,647 | 1/1990 | Uchiyama | 210/171 |
| 4,992,167 | 2/1991 | Uchiyama | 210/171 |
| 5,167,839 | 12/1992 | Widmer, II et al. | 210/784 |
| 5,230,793 | 7/1993 | Lenhart et al. | 210/167 |
| 5,310,046 | 5/1994 | Palmaer et al. . | |

FOREIGN PATENT DOCUMENTS

| | | |
|---|---|---|
| 47-25878 | 10/1972 | Japan . |
| 59-55645 | 4/1984 | Japan . |
| 2-125711 | 10/1990 | Japan . |
| 5-22007 | 3/1993 | Japan . |
| 5-293312(A) | 11/1993 | Japan . |
| 7-20234 | 4/1995 | Japan . |
| 7-204427 | 8/1995 | Japan . |
| 7-227507 | 8/1995 | Japan . |
| 8-215512 | 8/1996 | Japan . |
| 281220 | 12/1970 | U.S.S.R. . |

OTHER PUBLICATIONS

Translation of Japanese Patent JP–07227507 PTO 97–5557, Aug. 29, 1995.

*Primary Examiner*—David A. Reifsnyder
*Attorney, Agent, or Firm*—Merchant, Gould, Smith, Edell, Welter & Schmidt

[57] ABSTRACT

A filtration apparatus, used for obtaining cutting oils cleaned by using filtration apparatus so as to reuse the separated cutting oil in machining operations, includes an oil tank for storing filtered cutting oil, a storage tank for temporarily storing the filtration target cutting oil, a rotatably driven filtration drum, rotatably supported in the storage tank and having a side-surface in order to let a filtered oil to flow into the liquid tank, a dynamic seal member provided between the filtration drum and side wall of the storage tank, an injecting means for washing filters and dip-up plates for continuously conveying cutting downward from a charge port to discharge port.

8 Claims, 9 Drawing Sheets

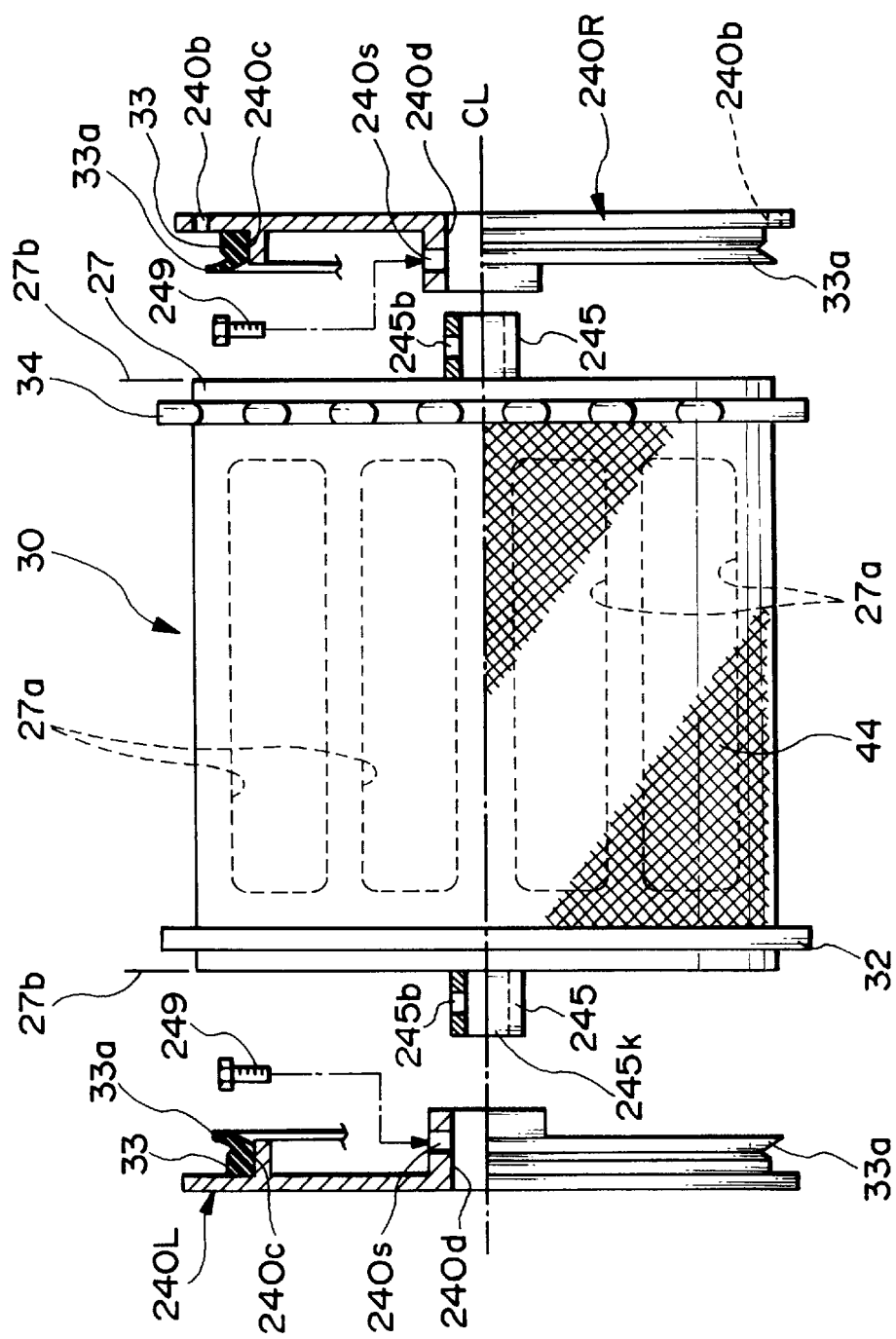

005,849,183

FILTRATION APPARATUS

This is a continuation-in-part application of U.S. patent application Ser. No. 08/705,750 filed on Aug. 30, 1996 entitled "FILTRATION APPARATUS" now abandoned.

BACKGROUND OF THE INVENTION

The present invention relates to a filtration apparatus and, more particularly, to a filtration apparatus which can separate a cutting oil, which is obtained by filtering a turbid liquid consisting of a liquid and solid material having different particle sizes after the cutting oil is used in metal cutting, thereby obtaining cutting oils so that the cutting oils can be reused.

Conventionally, many filtration apparatuses have been proposed which separate a cutting oil consisting of cuttings, after it is used in metal cutting, into cuttings and cutting oils, thereby obtaining cutting oils (hereinafter referred to as cleaned cutting oils) that can be reused.

The "filtration apparatus" of Japanese Patent Publication No. 2-44564 is an example of an improvement of such a filtration apparatus. According to this apparatus, a filtration drum is lightly rotated by causing its one end to float in a cutting oil so as to decrease the weight applied to the bearings of the filtration drum.

According to the "filtration apparatus" of Japanese Utility Model Publication No. 2-125711, floating cuttings which contain air in a continuous helical state during, e.g., lathing, thus obtaining a buoyancy to float on top of a cutting oil (hereinafter referred to as a filtration target cutting oil) to be filtered which contains cuttings, are caused to settle in the filtration target cutting oil.

When the floating cuttings are left to stand in this state, the floating cuttings accumulate to damage a filter wound on the outer circumferential surface of the filtration drum. This apparatus aims at preventing this damage.

By referring to FIG. 9, which shows a plan view of the arrangement of the part of a filtration apparatus eliminating cover of the above mentioned apparatus, the construction is now described.

Referring to FIG. 9, the left side of the filtration drum 300 is rotatably supported by a shaft 301 which is supported by a bearing mounted in a left side plate 102, while the filtration drum 300 has side opening portion at its right side which is rotatably supported by an annular member mounted on the right side plate 103. On the outer circumferential surface of the filtration drum, sprockets (not shown) are attached, and right and left chains 10 and 11 are meshed with at least one of the sprockets to give rotating force to the filtration drum as shown by an arrow D3.

On the outer circumferential surface the filtration drum 300, a filtation filter 302 made of stainless steel mesh, synthetic fiber mesh, wedge wire, or punching metal or the like are wound so that the filtration filter can be replaced. After the filtration target cutting oil is passed through the filtation filter 302, cleaned cutting oil is obtained. Cleaned oil thus obtained is flown into a clean tank 101 in a direction as shown by an arrow W.

At an inner portion of the filtration drum 300, blow-off pipe 145 is provided, which sprays cleaned cutting oil against the filtration filter 302, thus preventing clogging of the filtration filter 302. This is called a reverse spraying for realizing a continuous filtering operation of the filtration apparatus.

A number of dip-up plates 12 are provided between the endless chains of right and left chains 10 and 11 at a predetermined interval, which convey submerged cuttings in the filtration target cutting oil to the upstream portion of the apparatus in order to discharge cuttings via the discharge port.

In addition, on the outer circumferential surface of the filtration drum 300, floating cutting dip-up plate 131 for submerging floating cuttings on the surface of filtration target oil into the filtration target oil is provided. When the filtration drum 300 is rotated in a direction shown by an arrow D3, floating cuttings are submerged into a filtration target cutting oil by the rotating floating cutting dip-up plate 131, thus preventing accumulation of floating cuttings on the oil surface which can cause damage to the filtration filter 302.

According to the filtration apparatus mentioned above, it has been noticed that the following merits are obtainable. That is, the driving force for rotating the filtration drum can be reduced because the right side of the filtration drum is supported by floating in the filtration target cutting oil, and dip-up plates 12 can separate cuttings from oil during conveying operations to the downstream and, by preventing accumulation of floating cuttings on the oil surface, damage to the filtration filter can be eliminated.

SUMMARY OF THE INVENTION

However, according to the filtration apparatus mentioned above, by referring to FIG. 9, the left side of the filtration drum 300 is rotatably supported by the shaft 301 supported by a left side plate 102, while the right side of the drum is rotatably supported by an annular member (not shown) being attached to the right side plate 103, thus rotatably supporting in a floating manner. According to a construction mentioned above, a clearance H1 between the left side plate 102 and left side portion of the drum must be kept. Similarly, a clearance H2 between right side plate 103 and right side portion of the drum must be maintained.

In this construction, floating cuttings will easily penetrate into these clearances H1 and H2, and when a lot of floating cuttings penetrate into these clearances, the rotational movement of the filtration drum is restrained by accumulated cuttings, thus causing an overload to the driving force for the drum. In the worst case, the filtration drum will stop rotating, and in order to avoid this kind of operation, an additional safety device to stop the rotation of the drum when overload occurs must be provided.

Furthermore, depending on the shape of floating cuttings, the floating cutting dip-up plate 131 will sometimes operate to move floating cuttings towards downstream instead of upstream via the clearance H1 or H2, thus causing a reverse flow of the floating cuttings.

Furthermore, according to the above-mentioned apparatus, in order to rotate the filtration drum for long operating hours, sealing means for preventing filtration target oil flow into the filtration drum are provided. It has been found that after long operation hours, these sealing means do not work sufficiently to assure accurate filtration, thus inviting deteriorated filtering accuracy.

It has been discovered that when attaching the sealing means between the right side plate 103 and the right side portion of the drum, it is difficult to maintain sealing accuracy all over the sealing portion. The larger the diameter of the drum, the worse the sealing accuracy will be. Therefore, it has been concluded that in order to keep an accurate filtrating operation, sealing accuracy formed between the side portion of the rotating drum and the side plate must be maintained all over the sealing portion.

In the prior art technique, much attention must be paid in order to attach the sealing means between the rotating drum and the side plate to assure sealing, which decreases the productivity of the filtration apparatus to a great extent.

The present invention has been made in view of the above situations, and has as an object to provide a filtration apparatus in which the drive force of the filtration drum can be decreased, and can prevent the filtration drum from being set in an overloaded state, thereby enabling a continuous long operation.

In addition to the object mentioned, other objects of the present invention are to provide a filtration apparatus in which oil can be sufficiently eliminated from cuttings, damage to the filtration filter by floating cuttings can be avoided, an overloaded state of the filtration drum can be prevented reverse flow of floating cuttings can be prevented, by using a common driving source total manufacturing cost can be reduced, and maintenance of the filtration apparatus can be facilitated.

It is still another object of the present invention to provide a filtration apparatus in which filtration accuracy is not deteriorated after long operating hours and productivity for the filtration apparatus is greatly improved.

In order to solve the above problems and to achieve the above objects, according to the present invention, there is provided a filtration apparatus for obtaining a cleaned cutting oil by filtering a filtration target cutting oil, in which cuttings and a cutting oil are mixed after said cutting oil is used by industrial machines, thereby enabling re-use of said cutting oil, said filtration apparatus comprising, a cutting oil tank for storing said cleaned cutting oil, a storage tank for temporarily storing said filtration target cutting oil and having a charge port where said filtration target cutting oil is supplied, a rotatably driven filtration drum, rotatably supported and partially submerged in said storage tank, and having a side-surface opening in at least one surface thereof in order to let said cleaned cutting oil flow into said oil tank, and being provided with filtering means on an outer circumferential surface for filtering said filtration target cutting oil, a dynamic seal member provided between said filtration drum and side wall of said storage tank, and being fixed to said side wall for sealing an oil level of said filtration target cutting oil along two side surface portions of said storage tank, thereby dividing the oil level around said dynamic seal member into an upstream side and a downstream side, and for enabling said filtration drum to be rotatable in said storage tank, an injecting means for washing said filtering means reversely from inner sides to outer sides of said filtration drum, and a dip-up means for continuously conveying said cuttings downward from said charge port to a discharge port.

In the above-mentioned arrangement, the dynamic seal member assures a reduced driving force required to rotate the filtration drum, and a state wherein the filtration drum becoming an overloaded state is prevented, thereby enabling continuous long operation.

It should be noted that the present invention is not limited to the embodiments to be described below, and that various arrangements are possible within the scope of the appended claims.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 7 is a front view of the filtration drum shown in FIG. 6;

DETAILED DESCRIPTION OF THE PREFERRED EMBODIMENTS

Figure 1:
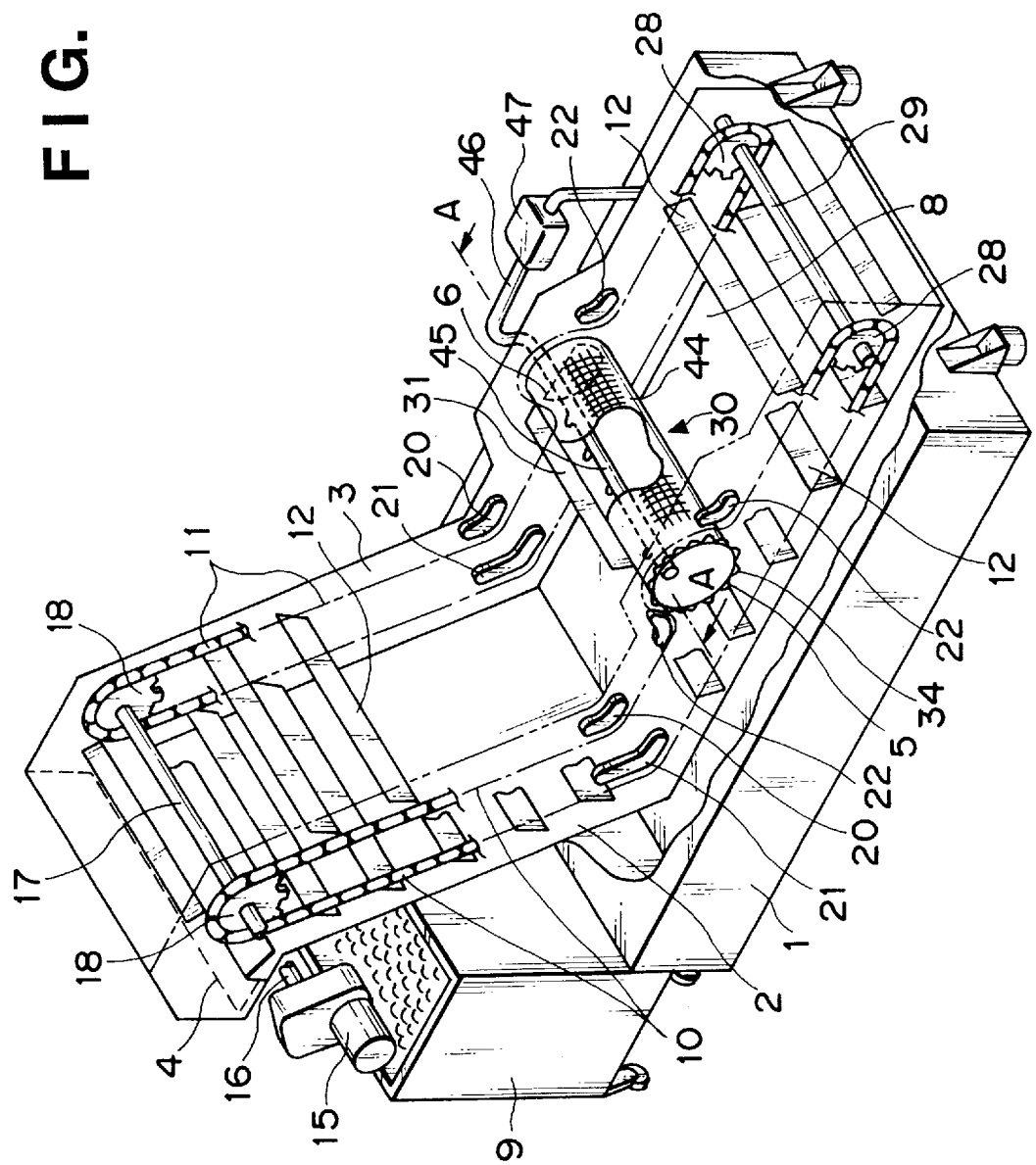
FIG. 1 is a perspective view showing the outer appearance of a filtration apparatus according to the first embodiment, from which a cover and the like are removed to show the internal arrangement of the main part.

The preferred embodiments of the present invention will be described with reference to the accompanying drawings. FIG. 1 is a perspective view showing a filtration apparatus according to the first embodiment of the present invention, from which a cover and the like are removed to show the internal arrangement of the main part.

By referring to FIG. 1, installation leg portions are fixed to the four corners of the clean tank, so that the clean tank can be fixedly installed on the floor surface in the factory with horizontal adjustment. The clean tank 1 stores cleaned cutting oil that is filtered in a manner to be described later.

A filtration target cutting oil storage tank, a bottom surface of which is partly shared by the clean tank 1. Storage tank 70 is arranged between the clean tanks 1 to store the filtration target cutting oil. For this reason, a left side plate 2 and a right side plate 3 (partially shown by a double dotted line) are fixed by welding to continue to the bottom surface and the front wall surface of the clean tank in a liquid-tight state. The respective constituent elements to be described below are mounted on the right and left side plates 2 and 3.

As shown in FIG. 1, upper stream portions of the left side plate 2 and the right side plate 3 have an almost common shape with the side wall of the clean tank so that the left side plate 2 and the right side plate 3 can be provided in the clean tank integrally. An opening 8 facing upward is provided at an upstream portion of filtration drum 30 that is rotably supported between the left side plate 2 and the right side plate 3 in a manner described later. Through the opening 8 filtration target cutting oil is supplied into the filtration target cutting oil tank.

As shown in FIG. 1, the left side plate 2 and the right side plate 3 are provided so that a downstream portion has an elongated portion which extends upwards diagonally. Between the uppermost portion of the plates 2 and 3, cutting discharge opening 4 shown by a dotted line is provided, from which cuttings are dropped into a cutting collecting box 9 to be placed under the portion of the cutting discharge opening 4.

Subsequently, at the uppermost portion of the plates 2 and 3, bearings not shown are provided, by which a sprocket shaft 17 fixing a pair of upper sprockets 18 is rotatably supported. Additionally, the sprocket shaft 17 is connected to an output shaft 16 of drive motor 15 incorporating a reduction unit being attached to the left side plate 2. In this structure, according as the drive motor 15 is driven, upper sprockets 18 are driven to continuously rotate in a clockwise direction.

Similarly, as shown in FIG. 1, bearings not shown are provided at an upstream portion of the plates 2 and 3, by which sprocket shaft 29 fixed with a pair of lower sprockets 28 is rotatably supported.

Right and left endless chains 10 and 11, parts of which are indicated by chain lines in FIG. 1, are provided between the upper and lower sprockets 18 and 28 to mesh with them. The right and left chains 10 and 11 are guided substantially along the right and left side plates 2 and 3, as shown in FIG. 1. Midway along the travel path of the chains 10 and 11, upper chain guides 20 and lower chain guides 21 are fixed at chain direction switch portions on the opposing surface of the right and left side plates 2 and 3. Drum chain guides 22 are also fixed on the opposing surfaces of the right and left side plates 2 and 3 on the upstream and downstream sides of the filtration drum 30, so that the chain rotates the filtration drum 30.

A predetermined number of dip-up plates 12 are fixed between the left chain 10 and the right chain 11 at a predetermined interval to continuously convey and feed the cuttings that have settled in the filtration target cutting oil to the downstream side. That is, the cuttings are conveyed to the downstream side and discharged. While the cuttings in the filtration target cutting oil are transported along the upstream side of the cuttings discharge port 4, the cuttings are sufficiently removed from the cutting oil.

A drum sprocket 34 is fixed on the outer circumferential surface of the filtration drum 30. A rotating force is supplied from the left chain 10 meshing with the drum sprocket 34, thereby constantly rotating the filtration drum 30 in a clockwise direction.

Filtration filters 44, which are made of a stainless steel metal mesh, a chemical fiber mesh, a wedge wire, a punching metal plate, or the like, are replaceably wound and fixed on the outer circumferential surface of the filtration drum 30. After the filtration target cutting oil is filtered by being passed through the filtration filters 44, thus obtaining cleaned cutting oils, the cleaned cutting oils are flowed into the clean tank 1 through a semicircular opening 5 formed in the left side plate 2 and a semicircular opening 6 (indicated by a broken line) formed in the right side plate 3.

At an inner portion of the filtration drum 30, blow-off pipe 45, connecting pipe 46 and pump 47 are installed. Cleaned cutting oil is sprayed against the filtration filter 44 through a nozzle of the blow-off pipe, thus preventing clogging of the filtration filter 44. This is called a reverse spraying operation for realizing a continuous filtering operation of the filtration apparatus.

In addition, on the outer circumferential surface the filtration drum 30 floating cutting dip-up plate 31 for submerging floating cuttings on the surface of filtration target oil into the filtration target oil is provided. When the filtration drum 30 is rotated in a clock wise direction, floating cuttings are forcibly submerged into the filtration target cutting oil by the rotating floating cutting dip-up plate 31, thus preventing accumulation of floating cuttings on the oil surface that would cause damage to the filtration filter 44.

The filtration apparatus described above can be made at a low cost since both the dip-up plates 12 provided at the predetermined interval and the filtration drum 30, both of which are provided between the right and left chains 10 and 11, can be driven by the drive force of one drive motor 15 serving as a common drive source. Since the charge port of opening 8 of the filtration target cutting oil can be set at a low position, the charging operation becomes easy. Since the cuttings can be dropped through the cuttings discharge port 4 into the cuttings recovery box 9 having a comparatively large height from the portion above it, a rational layout can be realized.

Figure 2:
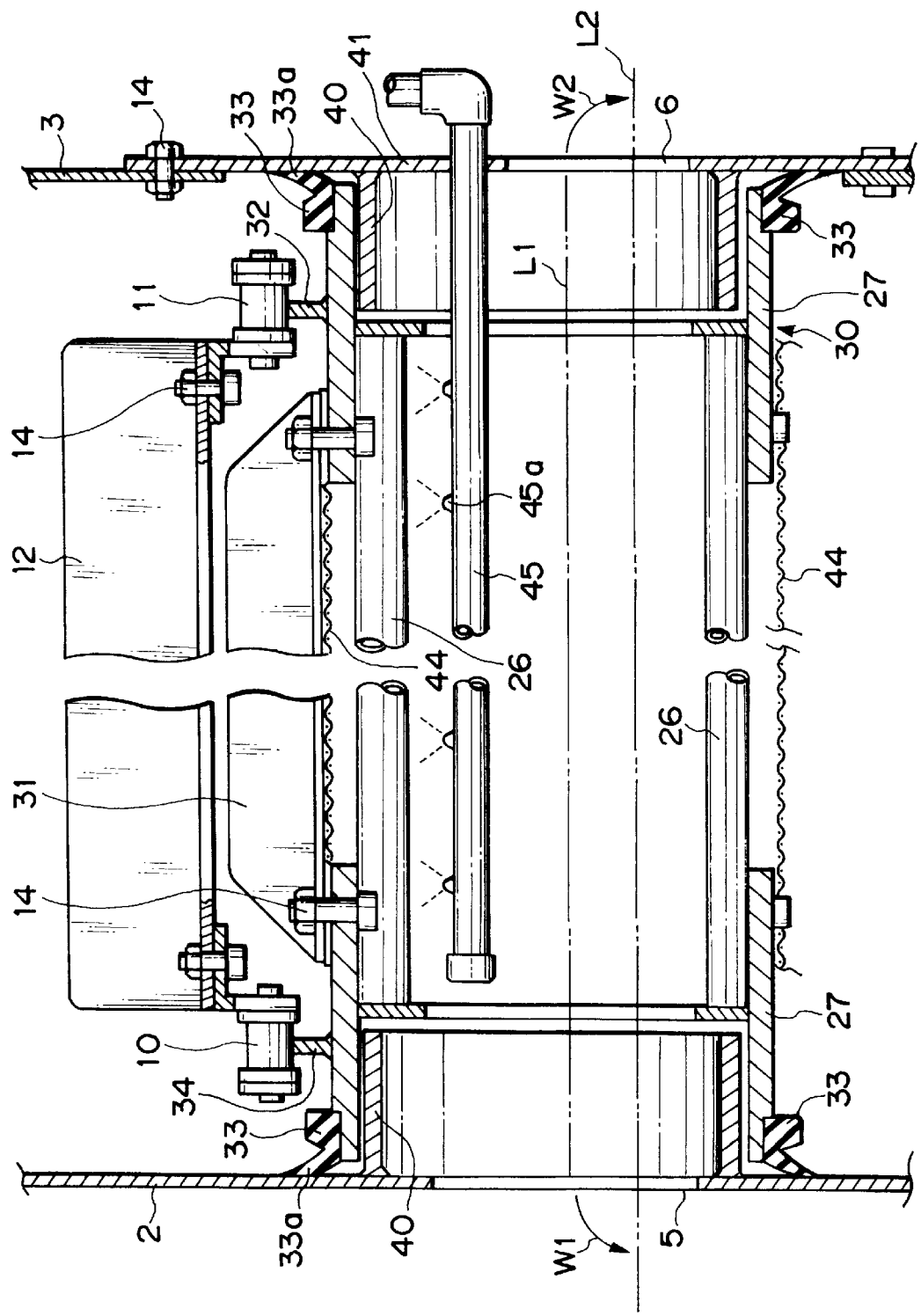
FIG. 2 a sectional view taken along the line A—A of FIG. 1.

FIG. 2 is a sectional view taken along the line A—A of FIG. 1. By referring to FIG. 2, the constituent elements that have not been described yet will be described. Around the circular opening 5, an annular guide member 40 is attached to the left side plate 2 by welding for example, so that it is elongated towards the filtration target cutting oil tank.

A mounting plate 41, in which the semicircular opening 6 is formed and on which the injection pipe 45 is fixed, is fixed to the right side plate 3 by using a plurality of bolts and nuts 14. Another annular guide member 40, beside the filtration target cutting oil tank, is similarly fixed to this mounting plate 41 by welding or the like. Thus, the filtration drum 30 which is constituted as a separate component can be set in the assembled state as indicated in the drawings.

The filtration drum 30 is constituted by integrally welding a plurality of pipe members 26 with right and left base plates 27 so that the drum has a predetermined width. On the outer surface of the drum, drum sprocket 34 and guide member 32 are fixed respectively, and right and left chain 10 and 11 are engaged or guided by drum sprocket 34 and guide member 32.

A floating cuttings dip-up plate 31 is fixed on the base plate 27 by using bolts and nuts 14, and filtration filter is also fixed to the base plate 27 in a stretched state.

The guide members 40 are inserted in and supported by the base portions 27 of the filtration drum 30 having the above arrangement in a loosely fitted state. Seal members 33 made of, e.g., rubber members called V seals or plate-like rubber seals, are fixed to the edge portions of the respective base portions 27 of the filtration drum 30. Seal portions 33a of the seal members 33 are in tight contact with the right and left side plates 2 and 3 and the wall surface of the mounting plate 41. Alternatively, the V seals may be fixed to the right and left side plates 2 and 3 and the mounting plate 41.

When the filtration drum 30 is formed and supported in the above manner, it constantly floats as the liquid level L1 of the filtration target cutting oil rises, and its clockwise rotation can be decreased.

By constructing and supporting the filtration drum 30 as described above, according as the oil level L1 of the filtration target cutting oil raises, the filtration drum 30 is pivotally held in a floating manner between the right and left side plates 2 and 3, and driving force needed to rotate in a clockwise direction is reduced. Furthermore, by the operation of the dip-up plate 31, the floating cuttings will settle in the filtration target cutting oil. Thus, the floating cuttings will be prevented from growing, thereby effectively preventing the filtration filters 44 from being damaged.

Since the filtration drum 30 is rotationally provided between the right and left side plates 2 and 3 with no gap by using the seal members 33, the floating cuttings are completely prevented from entering the downstream side of the filtration drum 30.

Figure 3:
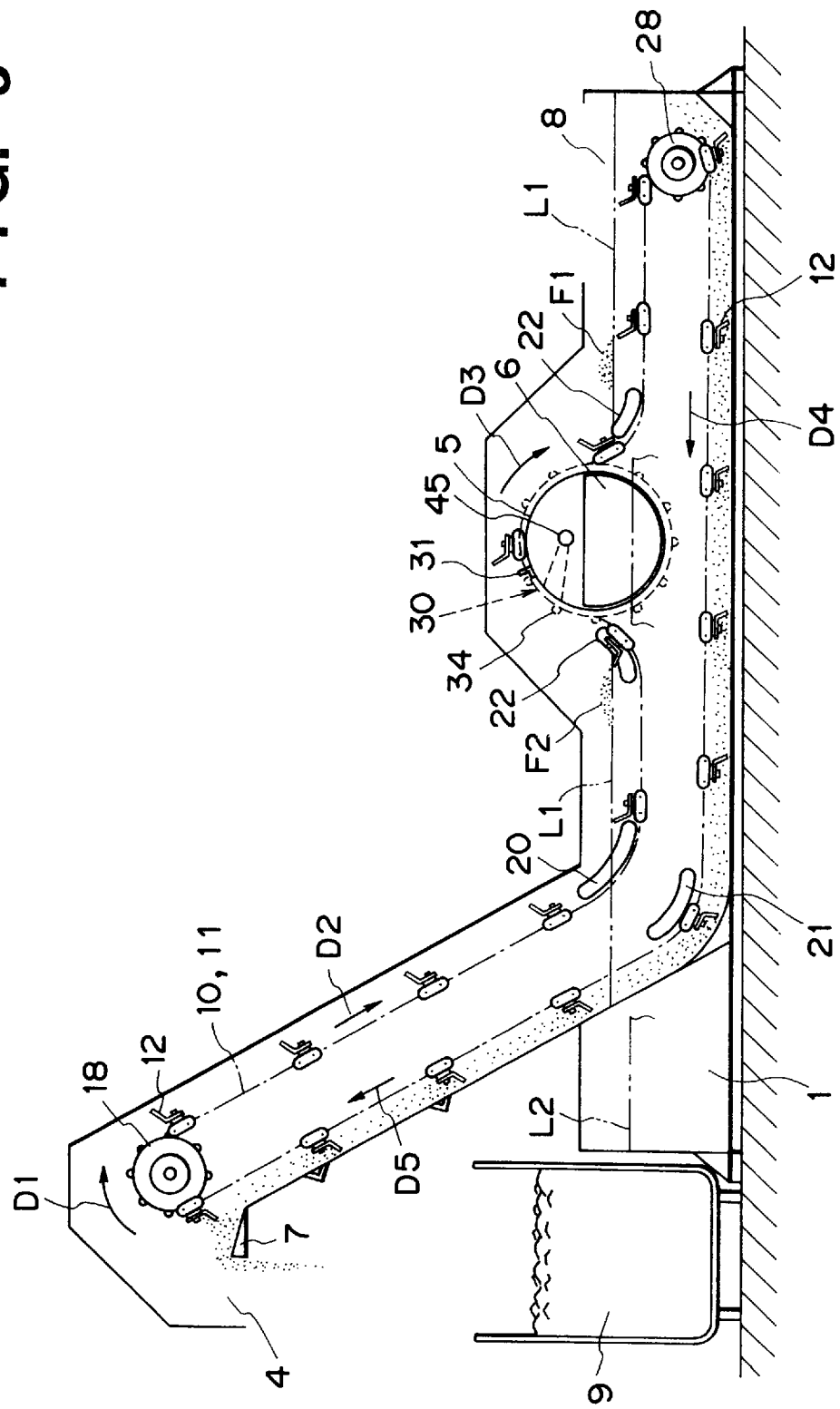
FIG. 3 is a side view for explaining the operation of the filtration apparatus.

FIG. 3 is a side view of the arrangement of the main part of the fractional filtration apparatus described above, and shows the operation of the same. Referring to FIG. 3, an inclined plate 7 is provided in the vicinity of the cuttings discharge port 4 to finally remove the cuttings from the cutting oil.

The operation of the fractional filtration apparatus will be described with reference to FIG. 3. The filtration target cutting oil is charged from the charge port 8, and the filtration drum 30 is set in the floating state. Consecutively, when a switch (not shown) is turned on, the upper sprockets 18 start to rotate in a direction indicated by an arrow D1 in FIG. 3. Thus, the right and left chains 10 and 11 are moved in a direction indicated by an arrow D2, are switched by the upper chain guides 20 in substantially the horizontal direction, and are guided by the drum chain guides 22 to mesh with the drum sprocket 34 and to move along the outer circumferential surface of the filtration drum 30, respectively, thereby driving the filtration drum 30 in the direction of arrow D3 in FIG. 3. The right and left chains 10 and 11 are then switched by the lower sprockets 28 to move downstream in a direction indicated by an arrow D4, and are guided by the lower chain guides 21 to move in the upper left direction indicated by an arrow D5.

Before or after this series of operations, the pump 47 is started to forcibly inject the cleaned cutting oils from the injection pipe 45 toward the filtration filters 44, thereby performing reverse washing. Alternatively, the filtration drum 30 is washed from its outer side.

When a predetermined period of time has elapsed after the above operation, the cleaned cutting oil is stored in the clean tank 1 up to a liquid level L2. During the series of operations, of floating cuttings F1 and F2 floating on the liquid level L1 of the filtration target cutting oil, the floating cuttings F1 floating on the charge port 8 side of the filtration target cutting oil are completely separated into upstream side floating cuttings and downstream side floating cuttings by the filtration drum 30. Thus, the floating cuttings F1 are completely prevented from being mixed with the floating cuttings F2 which float on the downstream side of the filtration drum 30. The floating cuttings F1 and F2 are settled out in the filtration target cutting oil by the operation of the dip-up plate 31. Thus, the floating cuttings are prevented from growing, thereby preventing the filtration filter 44 from being damaged.

Since the filtration drum 30 is rotated such that the seal portions 33a of the seal members 33 are in tight contact with the right and left side plates 2 and 3 and the wall surface of the mounting plate 41, an overload will not be generated at all, and a continuous operation is enabled. When a belt conveyor for continuously supplying the filtration target cutting oil is combined with the cutting collecting box for continuously conveying out the cuttings, an unmanned continuous operation can be performed.

Figure 4:
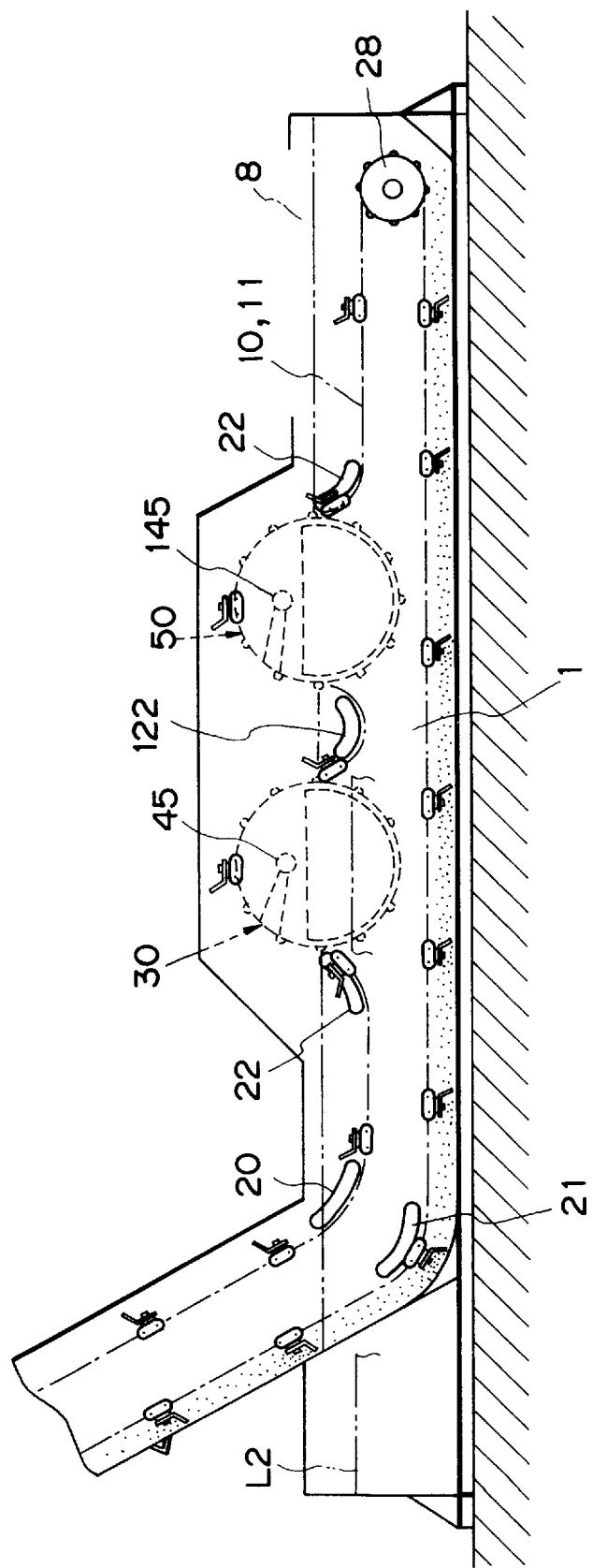
FIG. 4 is a side view of a filtration apparatus according to the second embodiment.

The second embodiment of the present invention will be described with reference to the side view of FIG. 4. Referring to FIG. 4, portions identical to those described above will be denoted by the same reference numerals, and a repetitive description will be omitted. Only characteristic portions different from those of the above embodiments will be described. A second filtration drum 50 is provided on the upstream side of the filtration drum 30, in almost the same manner as described in FIG. 2. Second injection pipe 145 is provided in the second filtration drum 50 to supply cleaned cutting oil, thereby washing filtration filter provided on the outer circumferential surfaces of the second filtration drum 50 in the reverse direction.

According to the filtration apparatus having the above arrangement, the cleaning action is enhanced by the existence of the additional second filtration drum 50, so that the convey speed of the right and left chains can be doubled, in addition to the operations and effects described above. Even if one filtration drum causes clogging, a marginally satisfactory cleaning action can be expected.

Although not shown, if a third filtration drum is further provided, a still more effective cleaning action can be realized.

Figure 5:
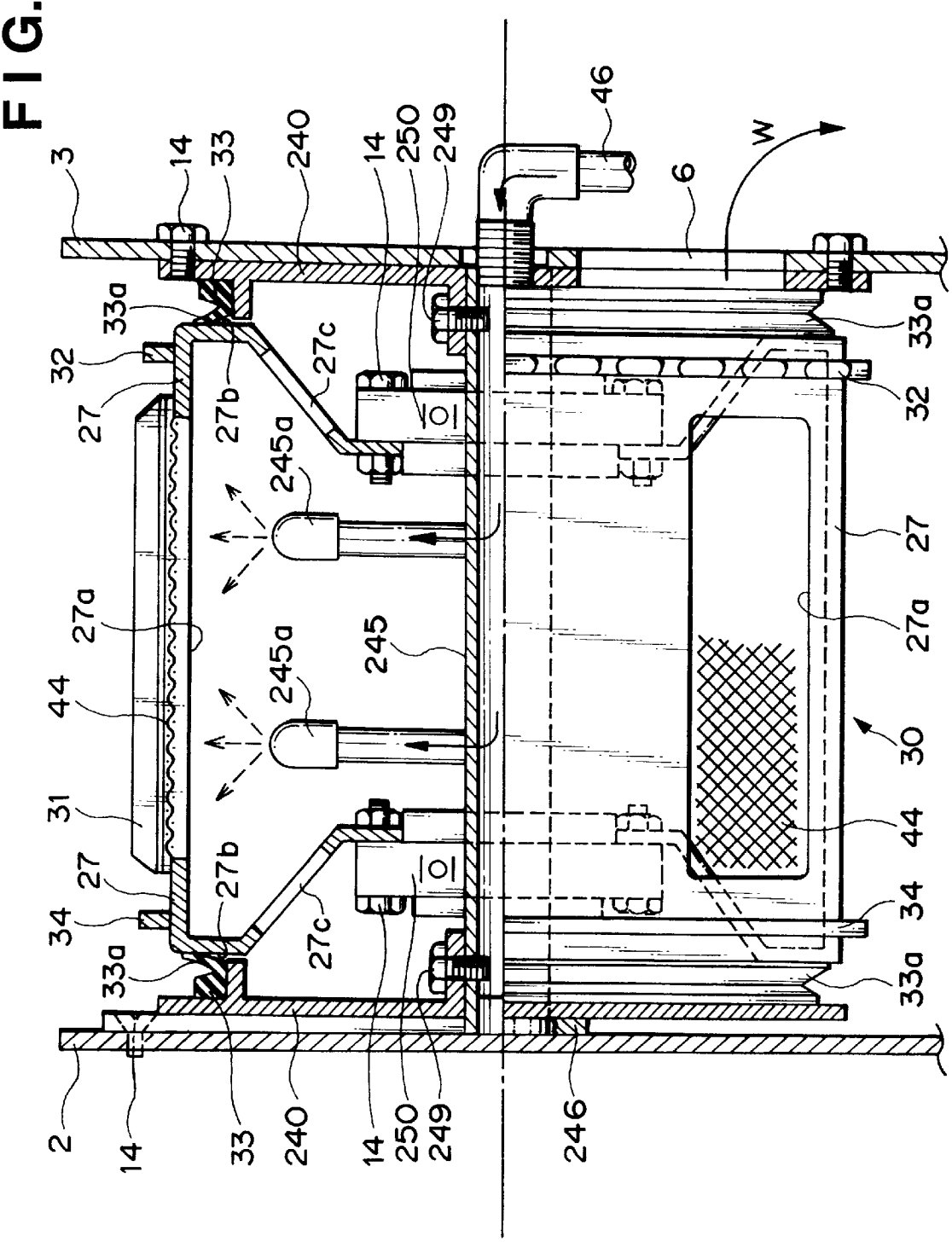
FIG. 5 is a half sectional view taken along a centerline of the filtration drum according to the third embodiment.

FIG. 5 is a half sectional view taken along a centerline of the filtration drum according to the third embodiment. Referring to FIG. 5, portions identical to those described above will be denoted by the same reference numerals, and a repetitive description will be omitted, only characteristic portions different from those of the above embodiments will be described.

The filtration drum 30 is rotatably supported by a shaft 245 having nozzles 245a for the reverse injection and being supported by a pair of bearings 250 at their inner race portion fixed to the shaft respectively. At the outer circumferential portion of the filtration drum base 27, openings for attaching filtration filter 44 are formed.

The base 27 and the bearings 250 are connected together via extension member 27c having openings by means of bolt 14 and nut as shown in FIG. 5. In addition, both right and left side surface portions 27b are finished to have flat surfaces in order to maintain a sealing state between a sealing portion 33a of the sealing member 33 according as the filtration drum 30 rotates. On the other hand, each sealing member 33 is respectively attached to the annular member 240 as shown in the FIG. 5. Annular member 240 of the right side is fixed to the right side plate 3 by means of bolt 14, and annular member 240 of the left side is fixed to the left side plate by means of flat headed bolt 14.

Additionally, these annular members 240 and the shaft 245 are integrally fixed by means of bolt 249. Pipe 46 for supplying cleaned cutting oil to the nozzle 245a is connected to the right distal end of the shaft and left distal end is sealed.

In the arrangement mentioned above, the filtration drum 30 is able to rotate around the shaft 245 by means of a pair of bearings 250 which assures rotating motion. In addition, reverse spraying means is easily mounted in the shaft 245.

The present invention is not limited to the arrangements described above, and various design modifications can be made as required. For example, regarding right and left side plates 2 and 3 occupying comparatively large areas, a clean tank 1, and the like, only their outer frames may be formed in advance, and iron plates having predetermined thickness may be welded as required, thereby forming the right and left side plates 2 and 3, the clean tank 1, and the like. A filtration drum 30 may be formed by fixing a filtration filter on a cylindrical integral body. The injecting directions of the respective injection pipes are not limited to those shown in FIG. 1 but can be changed as required. When the cuttings are limited to iron cuttings, settling-out of the cuttings can be promoted by disposing a permanent magnet on the bottom surface of the filtration target cutting oil storage unit.

According to the filtration apparatus described above, it becomes possible to provide a filtration apparatus in which the drive force of the filtration drum can be decreased, and can prevent the filtration drum from being set in an overloaded state, thereby enabling a continuous operation.

In addition to the effects mentioned above, it also becomes possible to provide a filtration apparatus in which oil is sufficiently eliminated from cuttings, damage to the filtration filter by floating cuttings can be avoided, an overloaded state of the filtration drum can be prevented, reverse flow of floating cuttings can be prevented, by using a common driving source total manufacturing cost can be reduced, and maintenance operation of the filtration apparatus can be facilitated.

Figure 6:
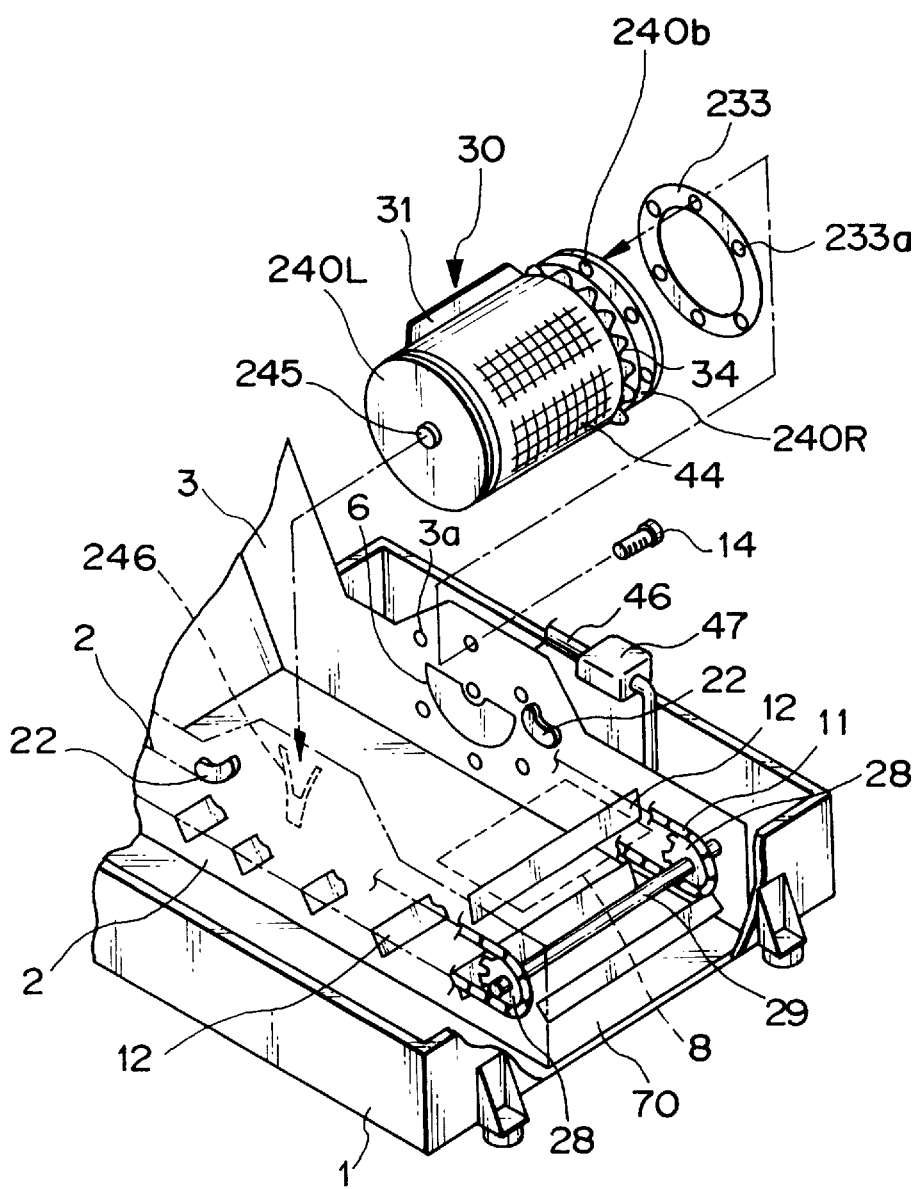
FIG. 6 is a perspective view showing the outer appearance of a filtration apparatus according to the fourth embodiment, from which a cover and the like are removed to show the internal arrangement of the main part.

By referring to FIG. 6, another arrangement of the apparatus is now described. As above, the same numerical references have been employed to similar components. At the upper portion of the clean tank 1, opening 8 shown by dotted line is provided. In addition, the filtration drum 30 for dividing the liquid surface of target cutting oil into upstream and downstream is prefabricated as shown, and the drum 30 is fixed to the inside portion of the target cutting oil tank by means of bolt 14. On the outer circumferential portion of the drum 30, filtration filter having predetermined filtration capability is detachably attached.

Furthermore, bow-off shaft 245 for rotably supporting the drum 30 and for spraying cleaned cutting oil towards filter 44 for the purpose of reverse spraying is mounted at the center of the drum 30. More specifically, at an inner portion of the filtration drum 30, cleaned cutting oil being supplied by a pump 47 is sprayed against the filtration filter 44 through a nozzle of the blow-off pipe 245, thus preventing clogging of the filtration filter 44.

In addition, on the outer circumferential surface the filtration drum 30 drum sprocket wheel 34 is fixed, which meshes with right chain 11 in order to give clockwise rotation to the drum.

Filtration filters 44, which are made of a stainless steel metal mesh, a chemical fiber mesh, a wedge wire, a punching metal plate, or the like, are replaceably wound and fixed on the outer circumferential surface of the filtration drum 30. After the filtration target cutting oil is filtered by being passed through the filtration filters 44, thus obtaining cleaned cutting oils, the cleaned cutting oils are flowed into the clean tank 1 through a semicircular opening 6 formed in the right side plate 3.

By referring to FIG. 6 and FIG. 7, which shows a front view of the drum 30 of the prefabrication state, the drum 30 has a shaft 245 which is connected to a pipe 46 for supplying cleaned cutting oil being pumped by pump 47.

In addition, near the semicircular opening 6 of the right side plate 3, several through holes 3a for allowing bolts 14 to pass through them and screw into screw hole 240b are provided. A rubber sheet 233 having several holes 233a corresponding to the through holes 3a is inserted between the right annular member 240R and the right side plate 3 for sealing purpose as shown.

On the other hand, the base 27 of the filtration drum 30 is attained from a gas pipe having a predetermined radius by cutting at planes perpendicular to the rotating axis, using a lathing machine for example. After the base 27 is thus obtained, flange members are welded at the cut planes so that the sealing portions 27b or the flat surface portions mentioned above are formed. Openings 27a for allowing cleaned cutting oil to flow are provided at the base 27.

In addition, V seal 33 is respectively attached to the ring portions 240c of the right annular member 240R and left annular member 240L by slightly increasing inner diameter of the V seal by hands or tools. After the preparation step described above, insert holes 240d of the right and left annular members 240R, 240L are inserted into the distal ends of the shaft 245, bolts 249 are inserted via through holes 240s and screwed against screw holes 245b, thus obtaining a semifabricated drum unit which maintains uniform contact condition between lip 33a of V seal 33 and flat surface 27b. For maintaining a uniform contact condition, it is recommended that both right and left annular members 240R, 240L are made by machining process using race. Furthermore, in order to facilitate the fabrication of the drum unit, spacers not shown are preferably used. For this operation, the shaft 245 is placed on the floor with its one distal end placed on the floor, each element being inserted as shown in FIG. 7. Spacers having a predetermined thickness are inserted between V seal 33 and flat surface 27b, bolts 249 are screwed and spacers are detached. The shaft 245 has a sealing member 245k at its distal end.

After the drum unit is thus obtained as shown in FIG. 6, the drum unit is fixed to the right side plate 3 by using the rubber sheet 233 and bolts 14. A distal end portion of shaft 245 which protrudes from the annular member 240L is placed onto the plate 246 being fixed on the left side plate 2.

After attaching the drum unit, chains are placed as mentioned above and cover (not shown) is fixed to obtain the finished apparatus. When replacing a filter, the drum unit can be easily detached by following the reverse steps mentioned above.

By constituting and fixing the drum unit according as mentioned above, it becomes possible to prevent a target cutting oil to flow inside of the rotating filtration drum via a sealing portion, which assures good filtration accuracy for a long period of operating hours and prefabrication time is greatly decreased for the better productivity.

Figure 8A:
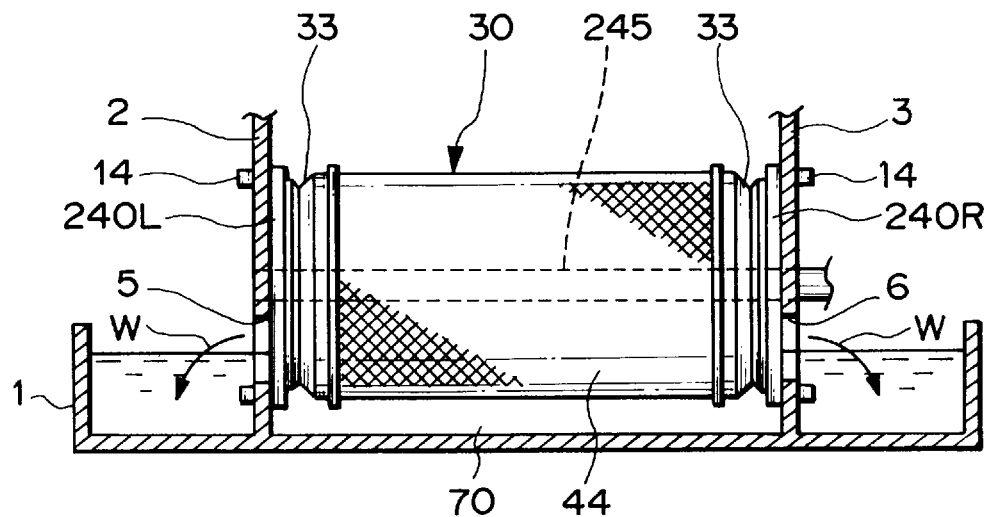
FIGS. 8A and FIG. 8B are sectional views of other embodiments of the filtration apparatus.
Figure 8B:
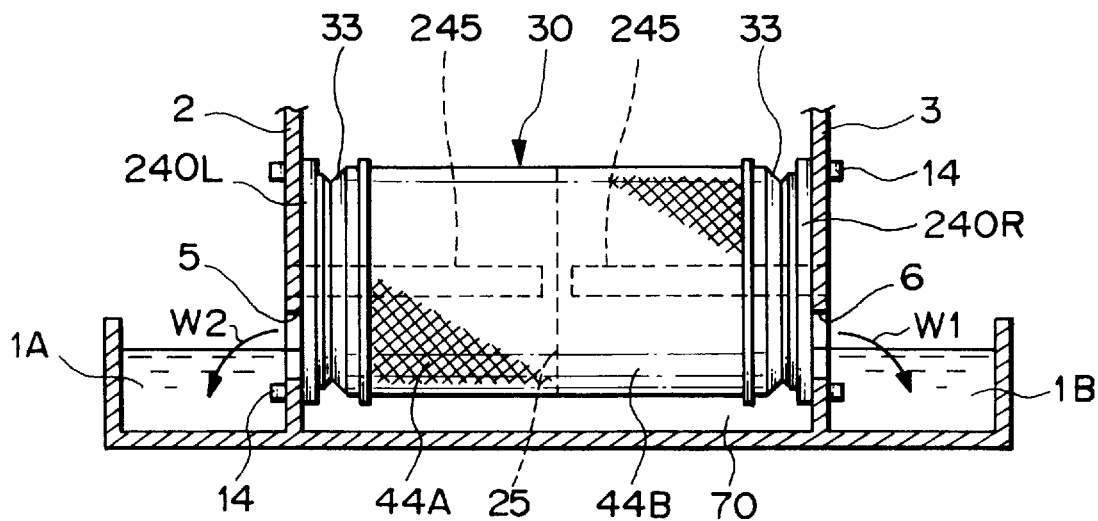
Figure 9:
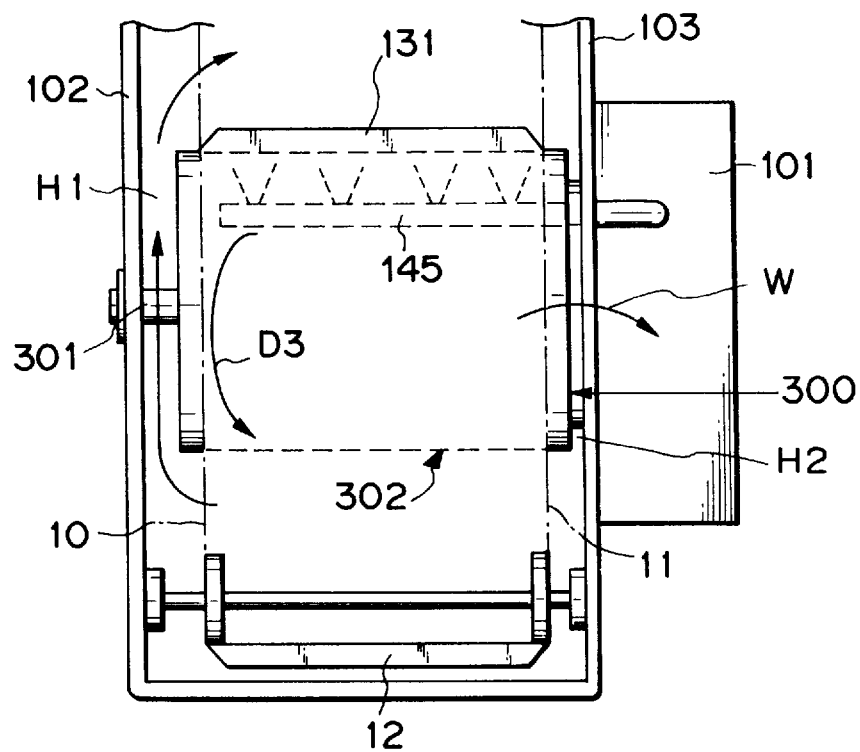
FIG. 9 is a plan view of a filtration apparatus according to the prior art.

Finally, FIGS. 8A and 8B show views of the drum unit wherein, FIG. 8A shows that the drum 30 is rotatably supported by a shaft 245 which is supported between right side plate 3 and left side plate 2. Openings 5,6 are provided at plates 2,3 so that cleaned cutting oil flows into clean tank 1 as shown by arrow W.

In FIG. 4B, separating wall 25 is provided inside a portion of the drum 30, and filters 44A and 44B having different filtration capability are attached by making the separating wall 25 as a separating line as shown. The drum 30 has two blow-off pipes 245 for reverse spraying and for rotatably supporting the drum 30.

In the above mentioned arrangement, cleaned cutting oils being cleaned by different filters flow into clean tanks 1A and 1B in the directions shown by arrow W1 and W2 via openings 5, 6. Thus different or selective filtration operation can be realized by one common drum 30.

As many apparently widely different embodiments of the present invention can be made without departing from the spirit and scope thereof, several driving motors for driving the drum can be employed or chain drive motors to drive right and left chains 10,11 are also possible.

Therefore, it is to be understood that the invention is not limited to the specific embodiments thereof except as defined in the appended claims.

What is claimed is:

1. A filtration apparatus for obtaining a cleaned cutting oil by filtering a filtration target cutting oil, in which cuttings and a cutting oil are mixed after said cutting oil is used by industrial machines, thereby enabling re-use of said cutting oil, said filtration apparatus comprising:

a cutting oil tank (1) for storing said cleaned cutting oil;

a storage tank (70) formed within said cutting oil tank for temporarily storing said filtration target cutting oil and having a charge port (8) where said filtration target cutting oil is supplied;

a rotatably driven filtration drum (30), rotatably supported and partially submerged in said storage tank (70), and having a side-surface opening (27c) in at least one surface thereof in order to let said cleaned cutting oil flow into said oil tank, and being provided with filtering means (44) on an outer circumferential surface for filtering said filtration target cutting oil;

said filtration drum (30) having a base (27) with a side surface (27b) where dynamic seal members (33) are provided, a shaft member (245) for rotatable supporting said drum (30) in said storage tank (70) and mounting means (249) for attaching said dynamic seal member (33), thereby dividing the oil level around said dynamic seal member into an upstream side and a downstream side, and for enabling said filtration drum (30) to be rotatable in said storage tank (70);

injecting means (245a) for washing said filtering means (44) reversely from inner sides to outer sides of said filtration drum (30); and dip-up means (10, 11) for continuously conveying said cuttings downward from said charge port (8) to a discharge port (4).

2. The apparatus according to claim 1, wherein a floating settling out means (31) is provided on an outer circumference of said filtration drum (30) for submerging floating cuttings towards upstream side on said oil level into said filtration target cutting oil.

3. The apparatus according to claim 1, wherein said storage tank (70) is formed to have said charge port at a lower portion, and said storage tank (70) is further integrally formed to have diagonally extended portion where a discharge port (4) at a comparatively large height is provided.

4. The apparatus according to claim 1, wherein said dynamic seal member (33) includes a V-shaped seal or a plate-type seal member made of elastic materials including industrial rubber.

5. The apparatus according to claim 1, wherein said dip-up means (10,11) comprises:

a sprocket and a guide member disposed in said storage tank to share a drive source with drive means that drives said filtration drum;

drum sprocket fixed to said filtration drum;

endless chains meshing with said sprocket and said drum sprocket and guided by said guide member; and one drive motor for driving said sprocket.

6. The apparatus according to claim 1, wherein in order to provide an injecting means in said shaft member, said shaft member is made of hollow pipe for letting filtered liquid flow therein.

7. The apparatus according to claim 1, wherein said drum has a separating means (25) for separating inside portion of said drum (830) into two chambers, so that said filtering means (44A, 44B) on an outer circumferential surface for filtering said filtration target cutting oil can be attached, thus realizing different filtration.

8. The apparatus according to claim 1, wherein a plurality of said drums (30) are fixed against inside wall portion (2, 3) of said storage tank (70) via elastic seal member (233).

* * * * *